(12) United States Patent
Heo et al.

(10) Patent No.: US 9,316,357 B2
(45) Date of Patent: Apr. 19, 2016

(54) PRESSURE VESSEL

(71) Applicant: ILJIN Composites Co., Ltd., Jeollabuk-do (KR)

(72) Inventors: Seok Bong Heo, Jeonju-si (KR); Do-yeon Kim, Jeonju-si (KR); Sang Jin Jeon, Jeonju-si (KR); Sung Chul Kim, Jeonju-si (KR); Bong Won Choi, Gwangju (KR)

(73) Assignee: ILJIN Composites Co., Ltd., Jeollabuk-do (KR)

( * ) Notice: Subject to any disclaimer, the term of this patent is extended or adjusted under 35 U.S.C. 154(b) by 212 days.

(21) Appl. No.: 13/855,067

(22) Filed: Apr. 2, 2013

(65) Prior Publication Data

US 2014/0144866 A1    May 29, 2014

(30) Foreign Application Priority Data

Nov. 23, 2012 (KR) .................. 10-2012-0133354
Nov. 23, 2012 (KR) .................. 10-2012-0133355

(51) Int. Cl.
*F17C 1/02* (2006.01)
*F17C 13/00* (2006.01)
*F17C 1/06* (2006.01)
*F17C 1/16* (2006.01)
*F17C 13/04* (2006.01)

(52) U.S. Cl.
CPC ............. *F17C 13/002* (2013.01); *F17C 1/06* (2013.01); *F17C 1/16* (2013.01); *F17C 2201/0109* (2013.01); *F17C 2201/056* (2013.01); *F17C 2203/0604* (2013.01); *F17C 2203/066* (2013.01); *F17C 2203/0619* (2013.01); *F17C 2203/0663* (2013.01); *F17C 2221/011* (2013.01); *F17C 2221/012* (2013.01); *F17C 2221/014* (2013.01); *F17C 2221/033* (2013.01); *F17C 2223/0123* (2013.01); *F17C 2223/035* (2013.01);

(Continued)

(58) Field of Classification Search
CPC .............. F17C 1/00; F17C 2201/0104; F17C 2201/0109; F17C 2205/0305; F17C 2205/037; F17C 13/002; F17C 1/06; F17C 1/16; F17C 2201/056; F17C 2203/0604; F17C 2203/0619; F17C 2203/066; F17C 2203/0663; F17C 2221/011; F17C 2221/222; F17C 2221/033; F17C 2223/0123; F17C 2223/035; F17C 2223/036; F17C 2260/036; Y02E 60/321
USPC .......................................... 220/586, 592, 588
See application file for complete search history.

(56) References Cited

U.S. PATENT DOCUMENTS 5,839,600 A * 11/1998 Moreira et al. .......... 220/560.04
8,087,537 B2 * 1/2012 Otsubo et al. ................. 220/581

(Continued)

FOREIGN PATENT DOCUMENTS

JP    2004-211783 A    7/2004
KR    20-0315902 Y1    6/2003

(Continued)

*Primary Examiner* — J. Gregory Pickett
*Assistant Examiner* — Niki M Eloshway
(74) *Attorney, Agent, or Firm* — Birch, Stewart, Kolasch & Birch, LLP

(57) ABSTRACT

There is provided a pressure vessel. The pressure vessel may include a nozzle-boss comprising a neck part including a hollow portion and a flange part extended outward from the neck part, a liner coupled with the nozzle-boss to provide a space filled with a fluid therein, and a sealing part inserted into a lower end of the neck part to prevent a spillage of the fluid via a boundary between the nozzle-boss and the liner by preventing a direct contact between the fluid and the boundary.

17 Claims, 19 Drawing Sheets

(52) U.S. Cl.
CPC ..... *F17C2223/036* (2013.01); *F17C 2260/036* (2013.01); *Y02E 60/321* (2013.01)

(56) References Cited

U.S. PATENT DOCUMENTS

2004/0173618 A1* 9/2004 Suzuki et al. ................ 220/581
2009/0255940 A1* 10/2009 Murate et al. ............... 220/592
2010/0258573 A1* 10/2010 Weber .......................... 220/586
2011/0210127 A1* 9/2011 Strack et al. ................. 220/586
2011/0220660 A1* 9/2011 Strack ......................... 220/586

FOREIGN PATENT DOCUMENTS

| KR | 10-2004-0084879 | A  | 10/2004 |
| KR | 20-0372069      | Y1 | 1/2005  |
| KR | 10-0469636      | B1 | 2/2005  |

* cited by examiner

PRESSURE VESSEL

CROSS-REFERENCE TO RELATED PATENT APPLICATION

This application claims the benefit of Korean Patent Application Nos. 10-2012-0133354 filed on Nov. 23, 2012 and 10-2012-0133355 filed on Nov. 23, 2012 in the Korean Intellectual Property Office, the disclosure of which is incorporated herein in its entirety by reference.

BACKGROUND OF THE INVENTION

1. Field of the Invention

The present invention relates to a pressure vessel, and more particularly, to a pressure vessel capable of preventing an abnormal leakage of a fluid by preventing a separation between a nozzle-boss and a liner.

2. Description of the Related Art

Pressure vessels are used for storing various fluids such as oxygen, natural gas, nitrogen, hydrogen, etc and are typically manufactured by manufacturing nozzle-bosses and liners by using metallic materials and surrounding nozzle-bosses and liners by carbon fibers or glass fibers or depositing carbon fibers or glass fibers thereon.

However, general pressure vessels manufactured using metallic liners are heavy in weight and have a very low degree of corrosion tolerance simultaneously with high manufacturing costs due to metallic properties.

To overcome such limitations, plastic liners formed of synthetic resins are manufactured, which are lighter in weight than metallic liners and have an improved degree of corrosion tolerance due to plastic properties.

However, although pressure vessels are manufactured by using plastic liners, nozzle-bosses are formed of other metallic materials or nonmetallic materials different from liners, thereby generating deterioration of adhesive forces between metallic or nonmetallic nozzle-bosses and liners, which does not occur when using metallic liners.

That is, when using existing metallic liners, there is no problem in adhering liners and nozzle-bosses to one another. However, when using plastic liners, due to manufacturing processes and plastic properties, it is difficult to perfectly adhere plastic materials and metallic or nonmetallic materials to one another.

To overcome such limitation, plastic fasteners are generally used to bind plastic liners and metallic nozzle-bosses to one another. However, it is difficult to install plastic fasteners inside plastic liners.

As another example, grooves are formed on nozzle-bosses and nozzle-bosses are coupled with liners while being molded, in which it is difficult to provide a perfect bound state.

Accordingly, it is necessary to prevent abnormal leakages of fluids filling pressure vessels by improving binding forces between metallic or nonmetallic nozzle-bosses and plastic liners.

SUMMARY OF THE INVENTION

The present invention provides a pressure vessel capable of preventing an abnormal leakage of a fluid by preventing a separation between a nozzle-boss and a liner occurring due to a difference between thermal-expansion coefficients thereof while repetitively filling and discharging the fluid.

According to an aspect of the present invention, a pressure vessel includes a nozzle-boss including a neck part including a hollow portion and a flange part extended outward from the neck part, a liner coupled with the nozzle-boss to provide a space filled with a fluid therein, and a sealing part inserted into a lower end of the neck part to prevent a spillage of the fluid via a boundary between the nozzle-boss and the liner by preventing a direct contact between the fluid and the boundary.

The sealing part may include a contact-providing part in contact with the liner to increase an adhesive force between the liner and the nozzle-boss.

The contact-providing part may be projected toward the liner.

The contact-providing part may be projected while being depressed from a bottom surface of the sealing part and forming a certain pressure space.

An upper outer surface of the contact-providing part may be formed to be inclined downwardly toward the outside in a radial direction.

The liner may include a cover part covering a certain area of a bottom of the flange part and the flange part may include an insertion space forming part covering an inner end of the cover part to form a certain insertion space inside the cover part. The contact-providing part may be closely attached to the insertion space.

The pressure vessel may further include a pressure part inserted into the lower end of the neck part to press the sealing part upwardly in an axial direction.

The bottom surface of the sealing part may include a projection projected toward the pressure part to increase an adhesive force between the sealing part and the pressure part.

The projection may be formed sequentially in at least one row along a circumferential direction.

The pressure part may include at least one pressure hole to transfer pressure of the fluid to the sealing part.

The pressure vessel may further include a pressure improving part improving a fastening force of the sealing part by pressing the sealing part.

The pressure vessel may further include a separation preventing part surrounded by the liner and preventing a separation between the nozzle-boss and the liner.

The separation preventing part may be disposed inside a space provided by the boundary between the nozzle-boss and the liner.

The separation preventing part may be formed of a material having greater hardness or solidity than the liner.

The flange part may include a fastening part formed to be depressed inward in a radial direction in such a way that the liner is disposed and fastened to the flange part, and the separation preventing part may be disposed inside the fastening part.

The liner may be coupled with the nozzle-boss by insert-injection molding, and the flange part may include at least one insertion hole connected to the fastening part to discharge air existing inside the fastening part when synthetic resin for manufacturing the liner is inserted into the fastening part.

The liner may include a fastening-corresponding part formed to be corresponding to the fastening part.

The fastening part may allow a coupling space with which the liner is coupled to be increased toward the inside in the radial direction.

The fastening part may include a first fastening part and a second fastening part formed to be greater than the first fastening part, which are different in a width in an axial direction or a size relative to the coupling space with which the liner is coupled. The second fastening part may be formed inside the first fastening part in the radial direction and the separation preventing part is disposed inside the second fastening part.

A cross-section of the fastening part in the axial direction may have a cross shape to increase a coupling force between the liner and the flange part.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
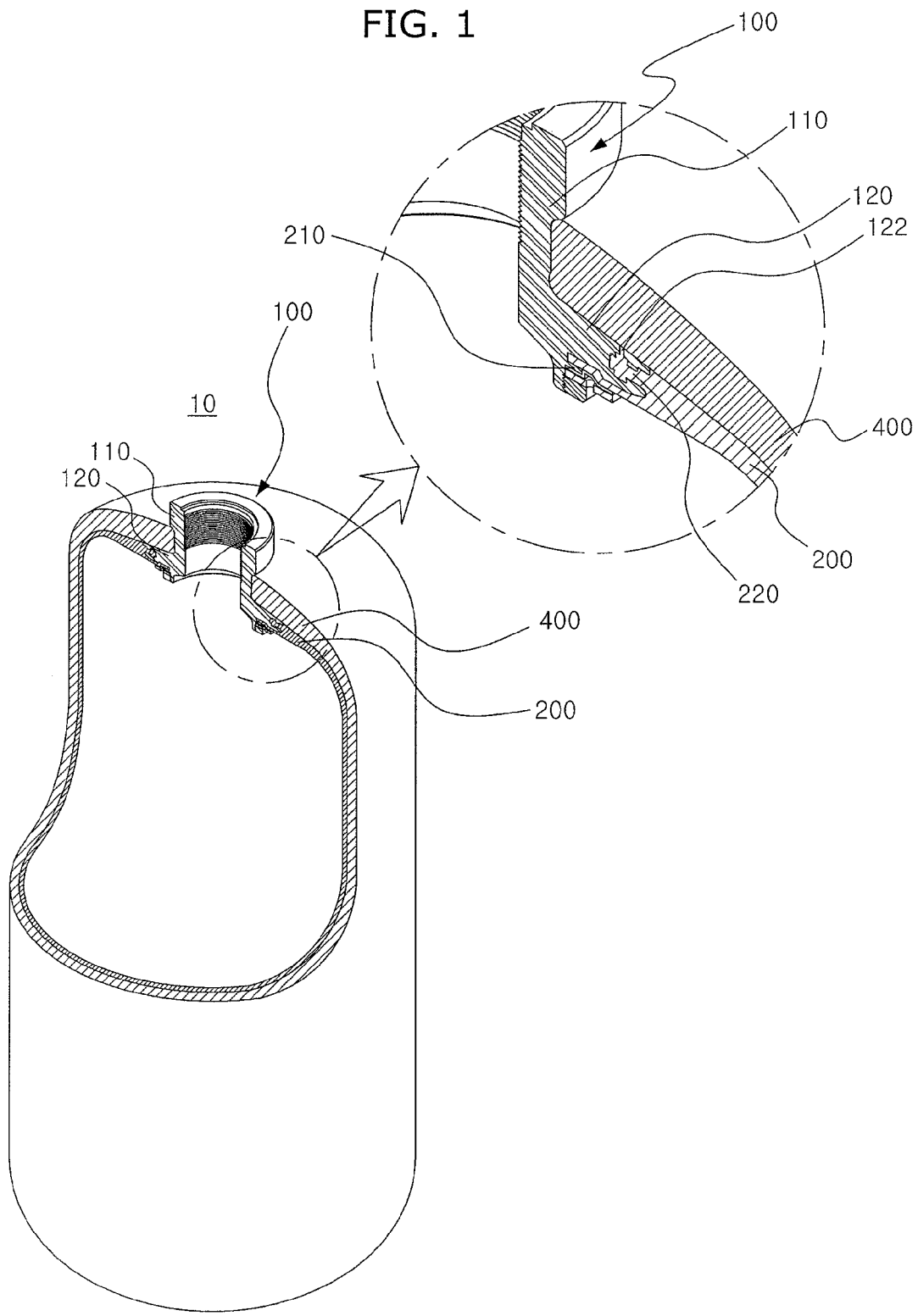
FIG. 1 is a partial exploded perspective view illustrating a pressure vessel according to an embodiment of the present invention.

Hereinafter, exemplary embodiments of the present invention will be described in detail with reference to the drawings. However, the present invention is not limited to the embodiments and a person skilled in the art understanding the spirit of the present invention may easily invent other examples included within the technical scope of the present invention through adding other elements or changing and deleting elements within the same technical scope, which may be considered as being included in the technical scope of the present invention. Also, the same reference numerals designate the same elements throughout.

Figure 2:
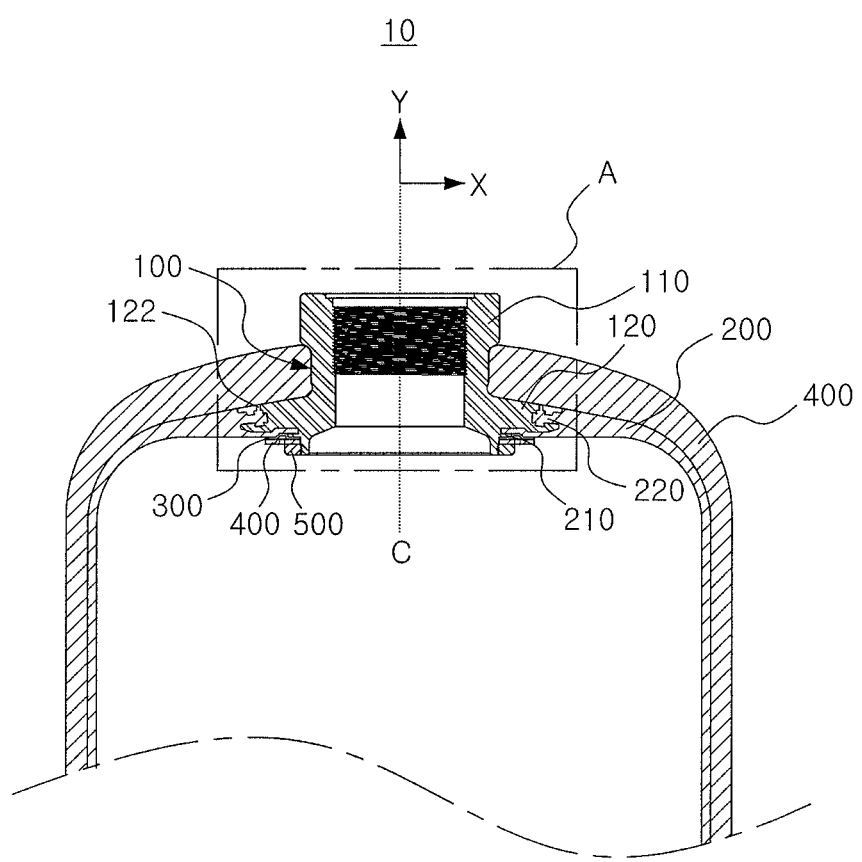
FIG. 2 is a partial cross-sectional view illustrating the pressure vessel of FIG. 1.
Figure 3:
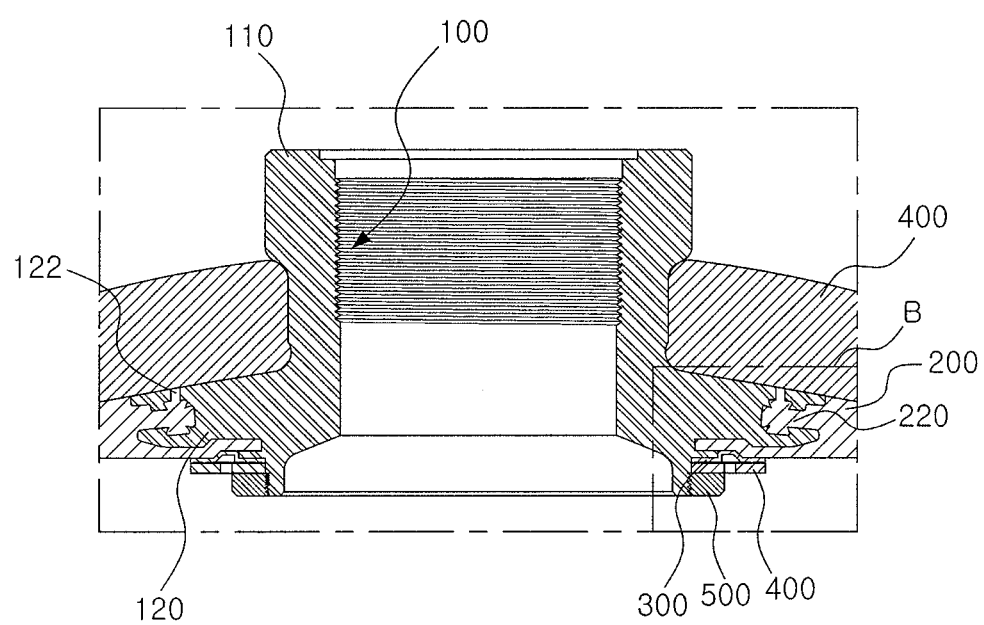
FIG. 3 is a schematic enlarged view illustrating A of FIG. 2.

FIG. 1 is a partial exploded perspective view illustrating a pressure vessel 10 according to an embodiment of the present invention, FIG. 2 is a partial cross-sectional view illustrating the pressure vessel 10, and FIG. 3 is a schematic enlarged view illustrating A of FIG. 2.

Figure 4:
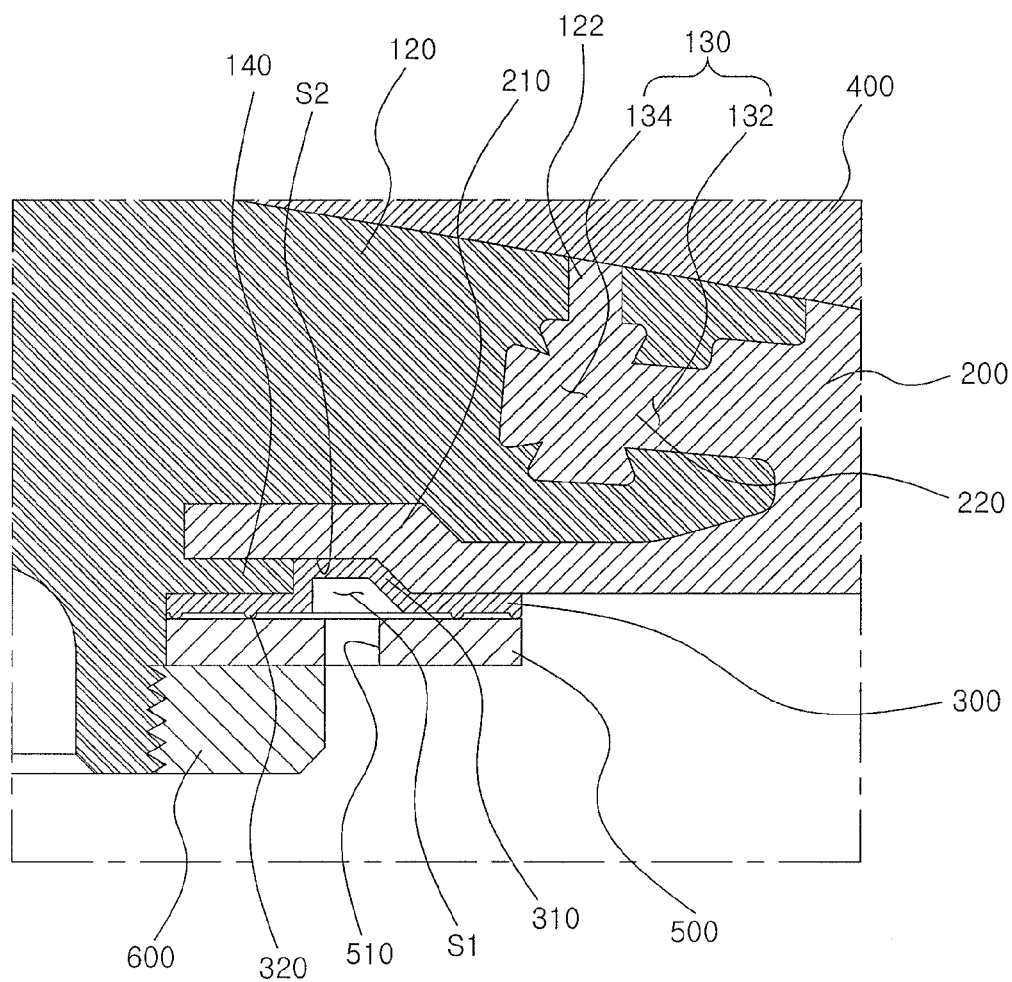
FIG. 4 is a schematic enlarged view illustrating B of FIG. 3.
Figure 5:
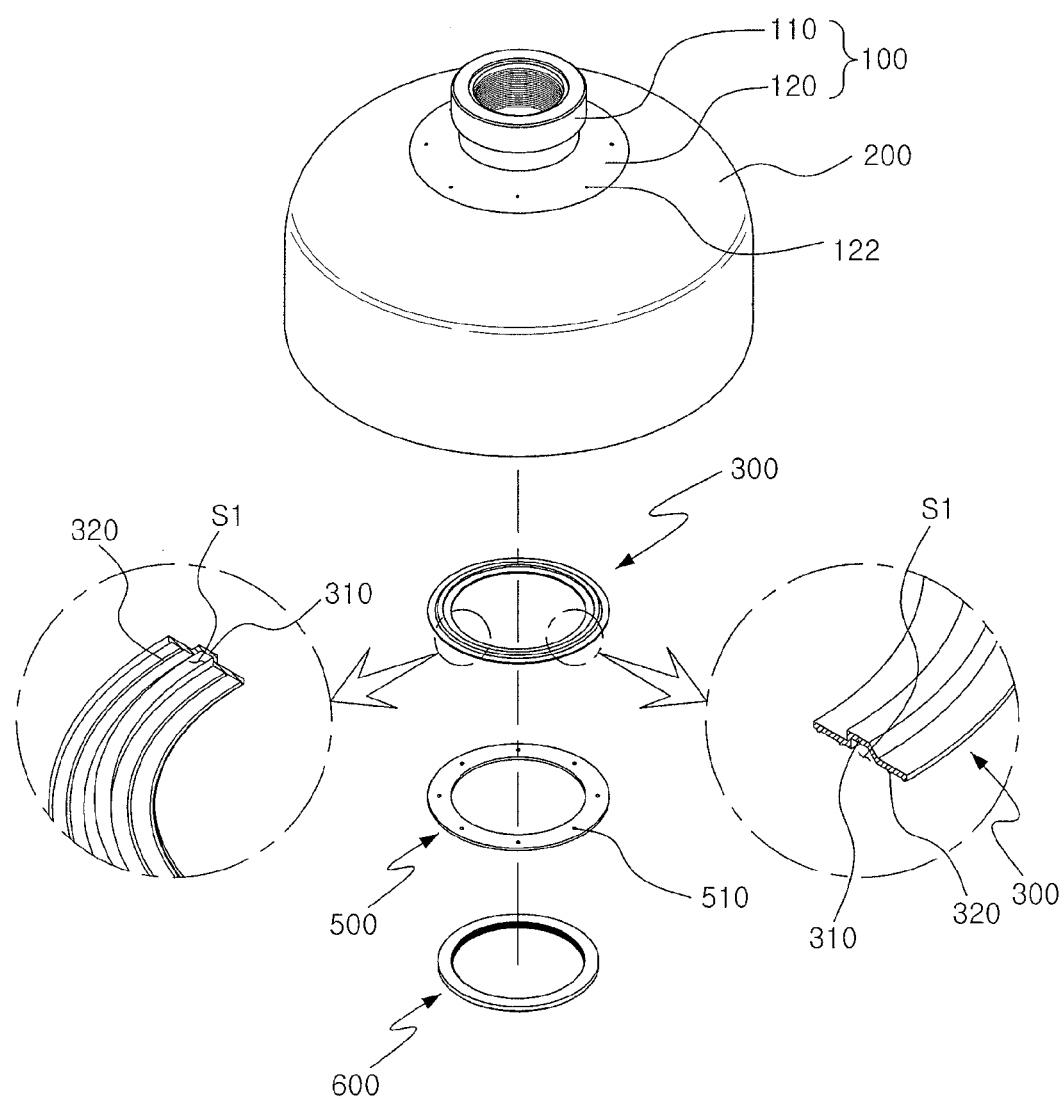
FIG. 5 is a schematic exploded perspective view illustrating the pressure vessel of FIG. 1 with composite materials omitted.
Figure 6:
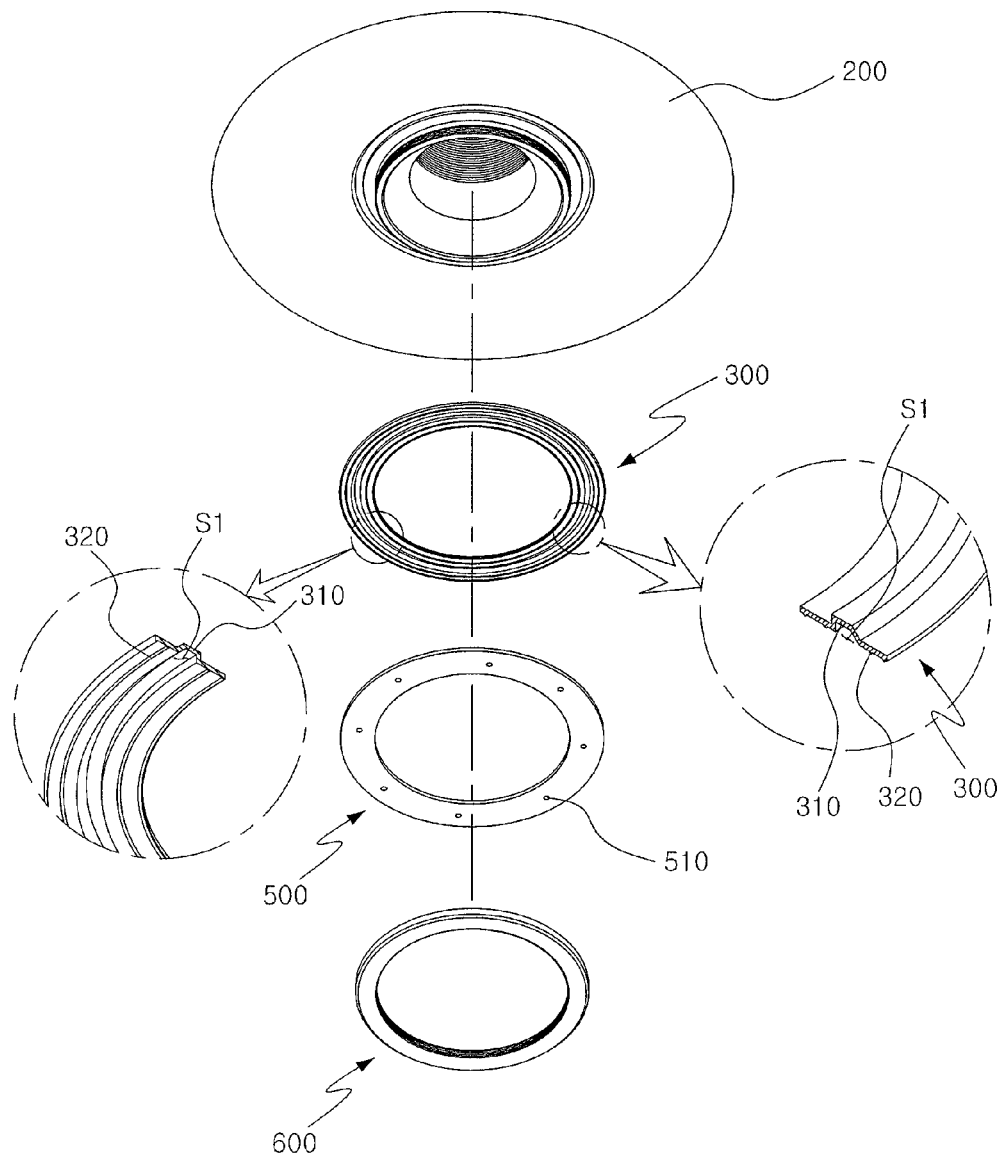
FIG. 6 is a schematic exploded bottom view illustrating the pressure vessel of FIG. 1.

Also, FIG. 4 is a schematic enlarged view illustrating B of FIG. 3, FIG. 5 is a schematic exploded perspective view illustrating the pressure vessel 10 with composite materials omitted, and FIG. 6 is a schematic exploded bottom view illustrating the pressure vessel 10.

To define terms related to directions, an outer or inner direction of a radial direction, as shown in FIG. 2, may designate a direction X from a center C of a neck part 110 toward an outer circumferential surface or a direction opposite thereto and an upper or lower direction of an axial direction may designate a direction Y from a bottom surface of the neck part 110 toward a top surface thereof or a direction opposite thereto.

Referring FIGS. 1 to 6, the pressure vessel 10 is used for storing various fluids such as oxygen, natural gas, nitrogen, hydrogen, etc therein and may be a kind of a structure to allow the fluid to be inserted and discharged repetitively.

In this case, the pressure vessel 10 may include a nozzle-boss 100 that becomes a path of inserting and discharging the fluid, a liner 200 coupled with the nozzle-boss 100 to provide a space to be filled with the fluid, and a sealing part 300 inserted into a lower end of the nozzle-boss 100.

Also, in the case of the pressure vessel 10, after the nozzle-boss 100 is coupled with the liner 200, to improve pressure-resisting properties, outsides of the nozzle-boss 100 and the liner 200 may be surrounded by a composite material 400 to a certain thickness, which will be described below.

The nozzle-boss 100 may include a neck part 110 with a hollow space and a flange part 120 extended from about a lower end of the neck part 110 toward the outside.

Since a screw thread is formed on an inner circumferential surface of the neck part 110, while filling the pressure vessel 10 with the fluid and discharging the fluid from the pressure vessel 10, screw-coupling with an external device is provided to prevent an abnormal spillage of the fluid.

On the other hand, the flange part 120 may be a part of the nozzle-boss 100, which is extended from about the lower end of the neck part 110 to an outer direction of a radial direction and may be coupled with the liner 200, thereby forming a boundary between the nozzle-boss and the liner 200.

In this case, the neck part 110 and the flange part 120, which are included in the nozzle-boss 100 may be manufactured by processing one of steel that is metallic, aluminum and plastic, which are nonmetallic. When completing the manufacturing the nozzle-boss 100, the nozzle-boss 100 is inserted into an inner space S3 of an injection mold 20 including an upper mold 22 and a lower mold and synthetic resin P is inserted into the injection mold 20, thereby forming the liner 200 to be coupled with the nozzle-boss 100 (refer to FIGS. 7 to 10).

That is, the liner 200 may be manufactured by insert-injection molding together with the nozzle-boss 100 and may be formed of plastic.

A manufacturing method will be described below in detail with reference to FIGS. 7 to 10.

The liner 200 is a kind of a plastic container including a certain inner space and may have ends formed in the shape of a hemisphere and a center part formed in the shape of a pipe.

The liner 200, instead of being manufactured as a single body, may be formed by manufacturing hemisphere-shaped parts and a central part having a cylindrical shape separately and coupling with one another by using a thermally welding process and the like.

This is to easily assemble a sealing part 300, a pressure part 500, and a pressure improving part 600, which are located inside the liner 200.

In this case, the sealing part 300 may be a kind of a sealing structure inserted into the lower end of the neck part 110 of the nozzle-boss 100 in order to prevent a spillage of the fluid via the boundary between the nozzle-boss 100 and the liner 200 by preventing a direct contact between the fluid and the boundary.

In other words, since the sealing part 300 is formed of silicone, the liner 200 is closely attached to the flange part 120 of the nozzle-boss 100 due to inner pressure of the pressure vessel 10 although the pressure vessel expands and then contracts, thereby preventing a separation between the liner 200 and the nozzle-boss 100 in advance.

On the other hand, a fastening force at the lower end of the neck part 110 of the sealing part 300 may be provided by the pressure part 500 pressing the sealing part 300 upwardly in an axial direction, and not shown in the drawings, the pressure part 500 is coupled with the lower end of the neck part 110, thereby fastening the sealing part 300 by using only the pressure part 500.

In this case, the sealing part 300 may include a contact-providing part 310 in contact with the liner 200 to improve an adhesive force between the liner 200 and the nozzle-boss 100, and the contact-providing part 310 may be projected toward the liner 200.

In other words, the contact-providing part 310 may be projected upwardly in an axial direction while being depressed from a bottom of the sealing part 300 and forming a certain pressure space S1 and may be closely attached to an insertion space S2 provided by the flange part 120 of the nozzle-boss 100 and the liner 200.

That is, the liner 200 may include a cover part 210 covering a certain area of a bottom surface of the flange part 120 and the flange part 120 may provide an insertion space forming part 140 allowing the insertion space S2 to be formed inside the cover part 210 by covering an inner end of the cover part 210 in such a way that the contact-providing part 310 is inserted and closely attached into and to the insertion space S2 provided by the insertion space forming part 140 and the cover part 210.

In this case, an upper outer surface of the contact-providing part 310 may be formed to be inclined downwardly toward an outside of a radial direction, in which pressure inside the pressure vessel 10 presses the contact-providing part 310 in such a way that the contact-providing part 310 is in contact with the insertion space S2 effectively, thereby effectively preventing an abnormal spillage of the fluid.

Accordingly, the sealing part 300 prevents a spillage of the fluid via the boundary between the liner 200 and the nozzle-boss 100, in other words, blocks a path of the spillage of the fluid in such a way that inner pressure continuously presses the pressure space S1 of the sealing part 300 to closely attach the contact-providing part 310 to the insertion space S2, thereby preventing the abnormal spillage of the fluid although the pressure inside the pressure vessel 10 is low.

That is, since inner temperatures of general pressure vessels are increased to about 80° C. when press-filling the pressure vessels with fluids and are decreased to about −40° C. when rapidly discharging the fluids, nonmetallic nozzle-bosses and liners formed of plastic may be separated at boundaries therebetween or the liners may be folded due to differences of thermal expansion coefficients thereof when repetitively filling the pressure vessels with the fluids and discharging the fluids.

In other words, when pressures inside pressure vessels are high, boundaries between liners and nozzle-bosses may be maintained to be in contact with one another and may be kept being sealed. When the pressures inside the pressure vessels are low, the contacts therebetween are not strong not to maintain the sealing therebetween in such a way that fluids may abnormally spill.

However, in the case of the pressure vessel 10, the separation between the liner 200 and the nozzle-boss 100 is prevented by the sealing part 300, thereby preventing the abnormal spillage of the fluid via the boundary between the liner 200 and the nozzle-boss 100 in advance.

On the other hand, a continuous pressing force applied to the sealing part 300 caused by the inner pressure, that is, applying pressure of the fluid to the sealing part 300 may be provided by at least one pressure hole 510 formed on the pressure part 500 in addition to the pressure part 500. The pressure hole 510 may be formed to be connected to the pressure space S1.

In this case, a width of the pressure part 500 in the radial direction may be formed to be corresponding to the sealing part 300 or greater to cover the bottom of the sealing part 300 but the pressure inside the pressure vessel 10 may be normally transferred to the contact-providing part 310 by the at least one pressure hole 510 connected to the pressure space S1 provided by the contact-providing part 310.

On the other hand, the bottom of the sealing part 300 may include a projection 320 projected toward the pressure part 500 to improve an adhesive force between the sealing part 300 and the pressure part 500 and the projection 320 may be formed sequentially in at least one row along a circumferential direction.

In this case, the projection 320 may be elastically deformed and compressed by the pressing force of the pressure part 500.

Accordingly, due to the projection 320, the adhesive force between the sealing part 300 and the pressure part 500 may be more and more improved, and accordingly, the abnormal spillage of the fluid via the boundary between the liner 200 and the nozzle-boss 100 may be prevented.

Merely, the projection 320 is not limited to being formed sequentially in the at least one row along the circumferential direction but may be formed as a plurality of embossed parts or may be provided by changing surface roughness.

On the other hand, the pressure part 500 pressing the sealing part 300 may have an improved pressing force by the pressure improving part 600 and the pressure improving part 600 may press the pressure part 500 toward the sealing part 300, thereby improving a fastening force of the sealing part 300.

In this case, the pressure improving part 600 may be coupled with the lower end of the neck part 110 by screw-coupling while stably providing the pressing force to the sealing part 300.

On the other hand, the pressure vessel 10 may include a fastening part 130 to more and more effectively prevent the separation between the nozzle-boss 100 and the liner 200 and the fastening part 130 may be formed to be depressed inward in the radial direction from an outer end of the flange part 120 of the nozzle-boss 100.

In this case, the fastening part 130 may indicate a certain coupling space to allow the liner 200 to be coupled with the flange part 120.

Accordingly, the fastening part 130 may be a space provided by the boundary between the nozzle-boss 100 and the liner 200 and may be sequentially formed along a circumferential direction.

Also, the fastening part 130 may allow the coupling space with which the liner 200 is coupled to be increased inward in the radial direction.

In other words, the fastening part 130 may have a shape having a width increased in an axial direction toward the inside in the radial direction and may include a first fastening part 132 and a second fastening part 134 formed to be greater than the first fastening part 132, which are different in a width in an axial direction or a size relative to the coupling space with which the liner 200 is coupled.

The second fastening part 134 may be formed inside in a radial direction of the first fastening part 132, and a cross-section of the fastening part 130 in the axial direction may have a cross shape to increase a coupling force between the liner 200 and the flange part 120.

Merely, the cross-section of the fastening part 130 in the axial direction is not limited to the cross-shape but may be formed to be a circle, an oval, or various polygons, if the shapes may minimize a separation of the liner 200 from the nozzle-boss 100.

On the other hand, the liner 200 may include a fastening-corresponding part 220 corresponding to the shape of the fastening part 130 by insert-injection molding and the liner 200 and the nozzle-boss 100 may be stably coupled with each other by the fastening part 130 and the fastening-corresponding part 220.

Accordingly, when the inside of the pressure vessel 10 expands while being pressed or contracts due to discharge, the shape of the fastening part 130 may be formed to allow the coupling space with which the liner 200 is coupled to be increased toward the inside in the radial direction or to allow the width in the axial direction to be increased, thereby minimizing the separation of the liner 200 from the nozzle-boss 100.

On the other hand, the pressure vessel 10 may further include the composite material 400 surrounding the outside of the liner 200 and improving inner pressure properties, and the composite material 400 may be formed on the outside of the liner 200 to a certain thickness by immersing reinforcing fiber such as carbon fiber, glass fiber, and synthetic polyamide fiber into resin such as epoxy resin and filament-winding or depositing the resin.

In this case, the composite material 400 may be wound or deposited from an outer surface of the neck part 110 of the nozzle-boss 100.

FIGS. 7 to 10 are schematic cross-sectional views illustrating a process of coupling the nozzle-boss 100 with the liner 200 included in the pressure vessel 10.

Figure 7:
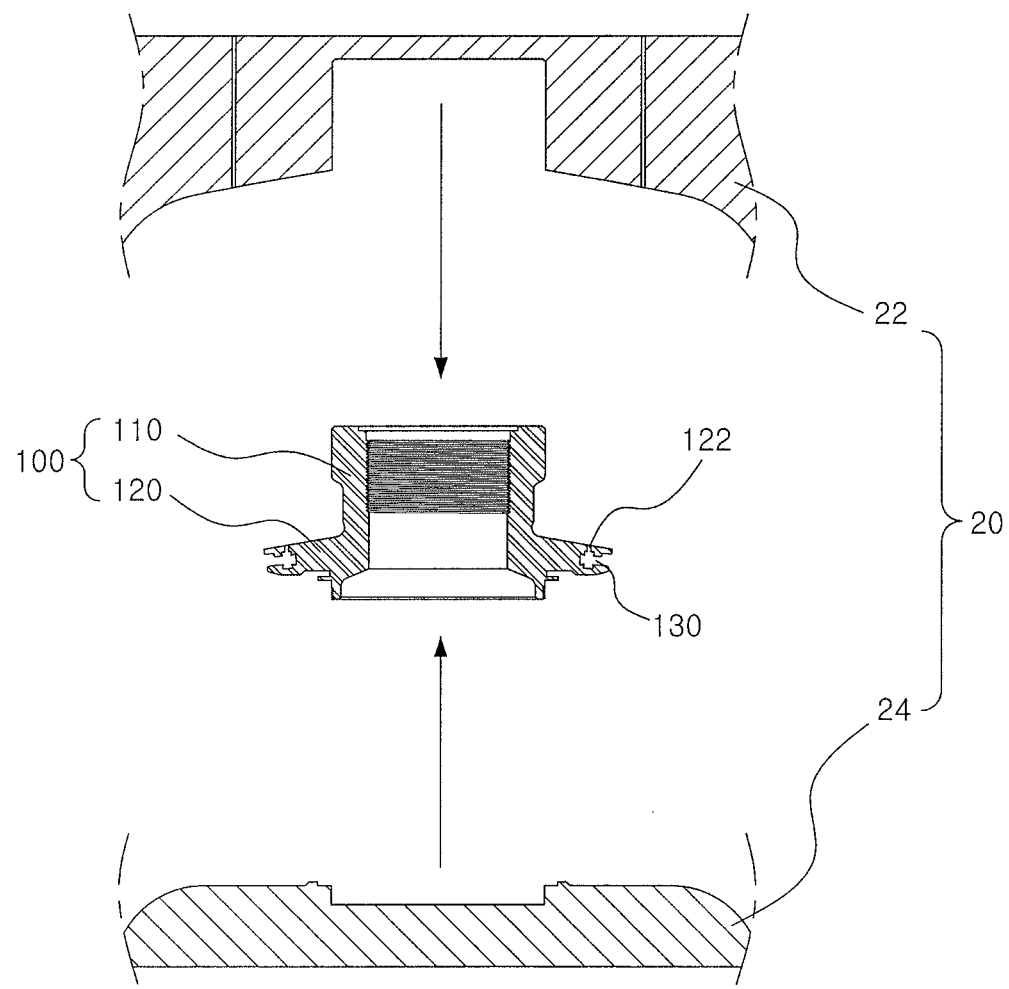
FIGS. 7 to 10 are schematic cross-sectional views illustrating a process of coupling a nozzle-boss with a liner included in the pressure vessel of FIG. 1.

Referring to FIG. 7, the nozzle-boss 100 including the neck part 110 and the flange part 120 are manufactured by processing steel that is metallic or aluminum or plastic that is non-metallic.

The nozzle-boss 100 previously manufactured may include the fastening part 130 depressed inward in a radial direction and sequentially formed in a circumferential direction.

In this case, the fastening part 130 may have a shape to have a width in an axial direction toward the inside in the radial direction, and the cross-section of the fastening part 130 in the axial direction may have a cross shape to increase an adhesive force between the liner 200 and the flange part 120.

Figure 8:
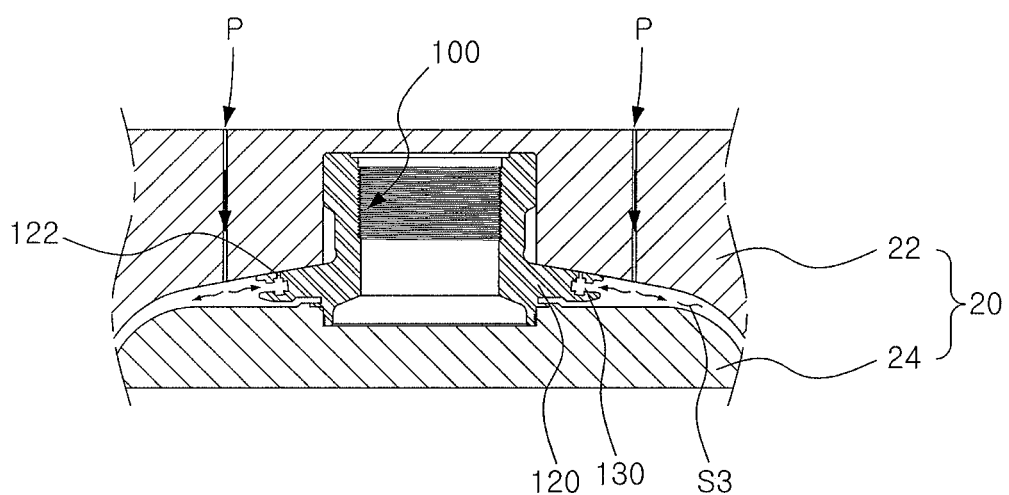

Referring to FIG. 8, the nozzle-boss 100 including the fastening part 130 is inserted into the inner space S3 of the injection mold 20 including the upper mold 22 and the lower mold 24 for insert-injection molding and then synthetic resin P is inserted into the injection mold 20, thereby forming the liner 200 coupled with the nozzle-boss 100.

In this case, the synthetic resin P may be one of various types of plastic resin, and more particularly, may be resin such as polyethylene having low transmittance with respect to compressed natural gas (CNG).

On the other hand, when the synthetic resin P is inserted into the inner space S3, the synthetic resin P may be inserted into the fastening part 130. Also, the flange part 120 of the nozzle-boss 100 may include at least one insertion hole 122 connected to the fastening part 130.

In this case, the insertion hole 122 may be a certain kind of an air flow path capable of discharging air existing in the inner space S3, that is, the fastening part 130 in such a way that the synthetic resin P is closely attached to the fastening part 130 to provide a strong coupling force.

Accordingly, since the synthetic resin P passes through the upper mold 22 from the outside and then is inserted into the fastening part 130 while the air existing in the inner space S3 is being discharged, the liner 200 may be more strongly coupled with the flange part 120.

Merely, the insertion of the synthetic resin P is not limited to the insertion via the upper mold 22 but may be inserted via the lower mold 24.

Figure 9:
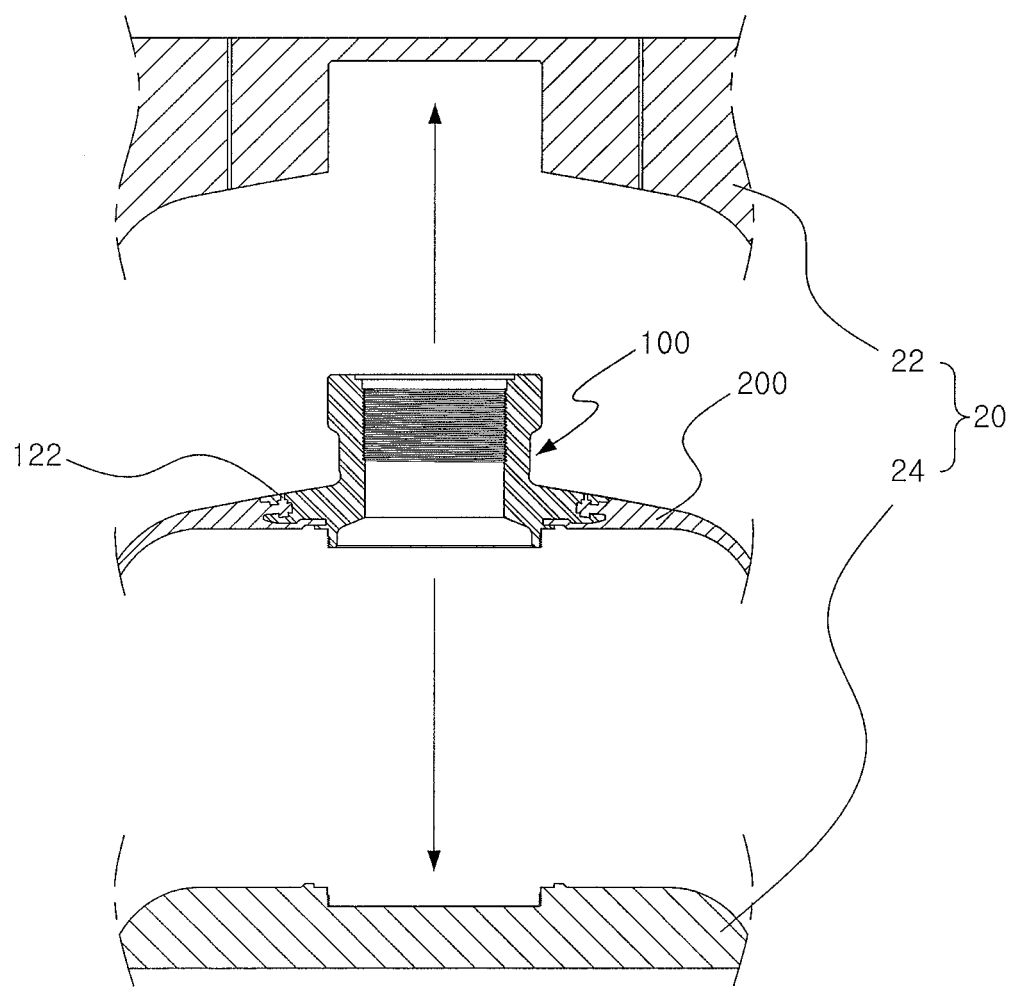

Referring to FIG. 9, when the insertion of the synthetic resin P into the injection mold 20 is finished, the upper mold 22 and the lower mold 24 are separated from each other, thereby completing a process of forming the nozzle-boss 100 and the liner 200 as a single body.

Figure 10:
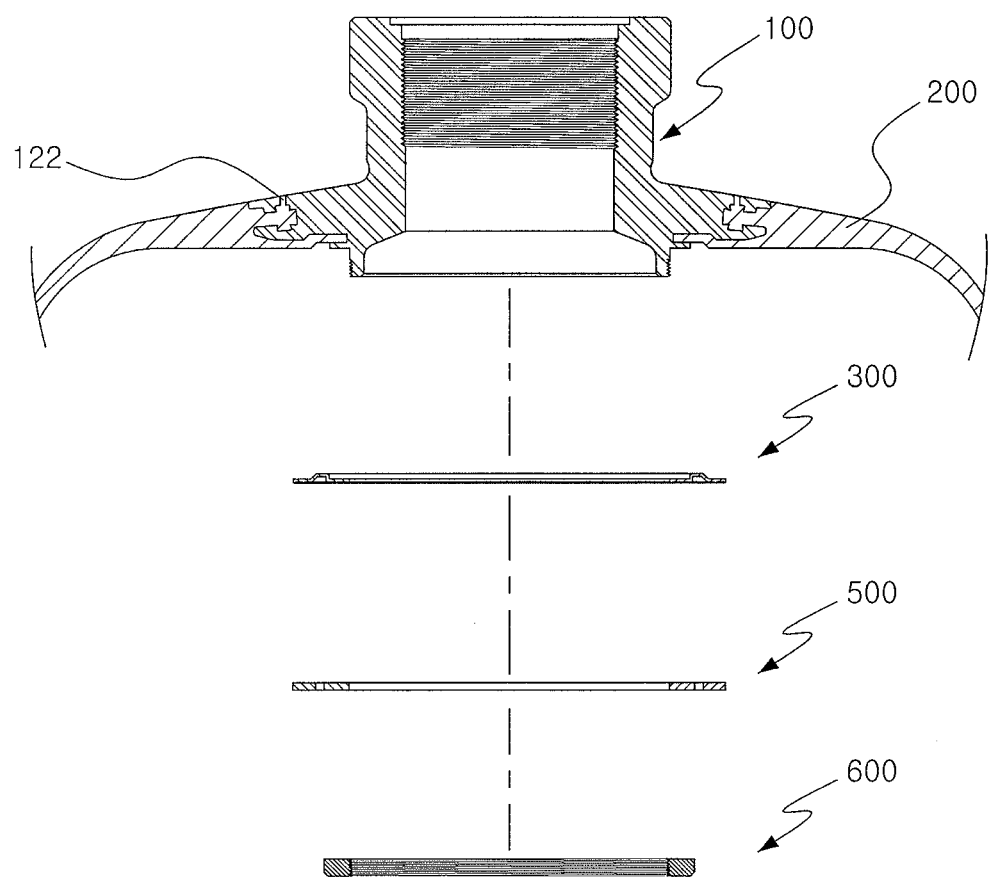

Referring to FIG. 10, when an insert-injection molding process of forming the nozzle-boss 100 and the liner 200 as the single body is completed, the sealing part 300 and the pressure part 500 are sequentially inserted into the lower end of the neck part 110 and then the pressure improving part 600 is screw-coupled therewith, thereby providing a certain pressing force to the sealing part 300.

Hereby, installing the sealing part 300 for preventing a separation between the nozzle-boss 100 and the liner 200 is completed. After this, two hemisphere-shaped single bodies formed of the nozzle boss 100 and the liner 200 and a liner formed in a pipe shape are thermally welded to one another and then the composite material 400 surrounds or is deposited on a surface of the liner 200, thereby manufacturing the pressure vessel 10 that is an end result.

Figure 11:
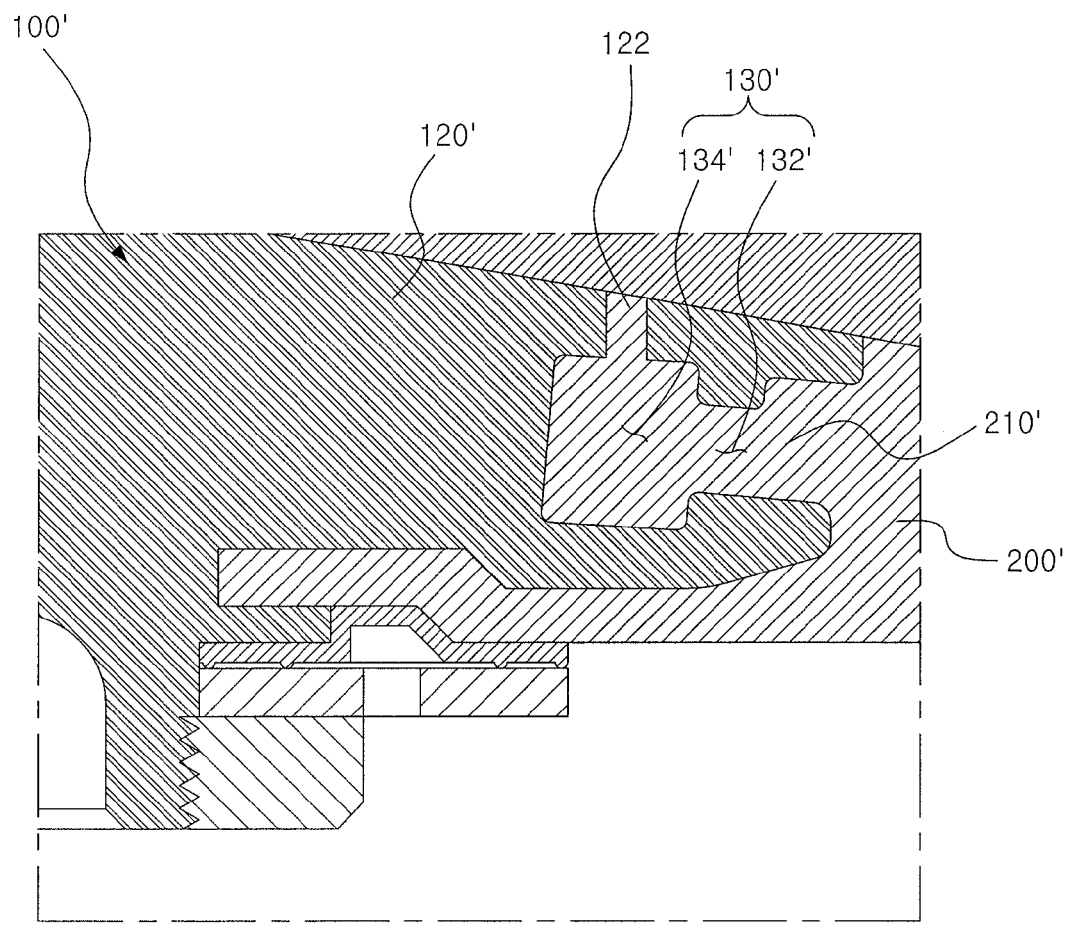
FIG. 11 is a schematic enlarged view illustrating a modified example of B of FIG. 3.

FIG. 11 is a schematic enlarged view illustrating a modified example of B of FIG. 3.

Referring to FIG. 11, since a configuration and effects are the same as described above except a fastening part 130' of a flange part 120' and a fastening-corresponding part 220' of a liner 200', a description except the fastening part 130' and the fastening-corresponding part 220' will be omitted.

In other words, the fastening part 130' may have a shape having a width increased in an axial direction toward the inside in a radial direction and may include a first fastening part 132' and a second fastening part 134' formed to be greater than the first fastening part 132', which are different in a width in an axial direction or a size relative to the coupling space with which the liner 200' is coupled.

The second fastening part 134' may be formed inward in the radial direction and may have a tetragonal shape with a polygonal cross-section in the axial direction.

Accordingly, the liner 200' may include the fastening-corresponding part 220' corresponding to the shape of the fastening part 130' by inserted injection molding and the liner 200' and a nozzle-boss 100' may be stably coupled with each other by the fastening part 130' and the fastening-corresponding part 220'.

Figure 12:
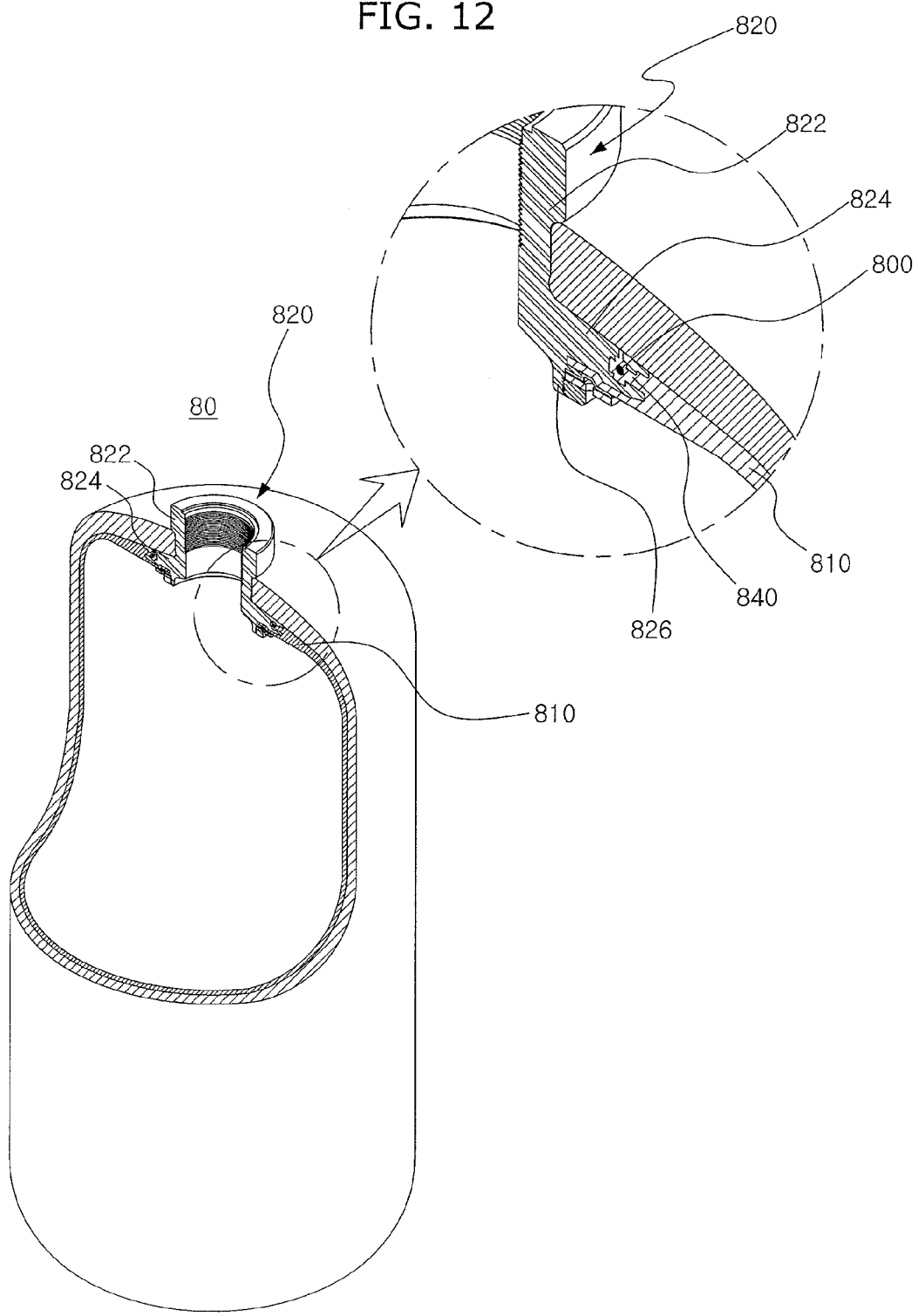
FIG. 12 is a partial exploded perspective view illustrating a pressure vessel according to another embodiment of the present invention.
Figure 13:
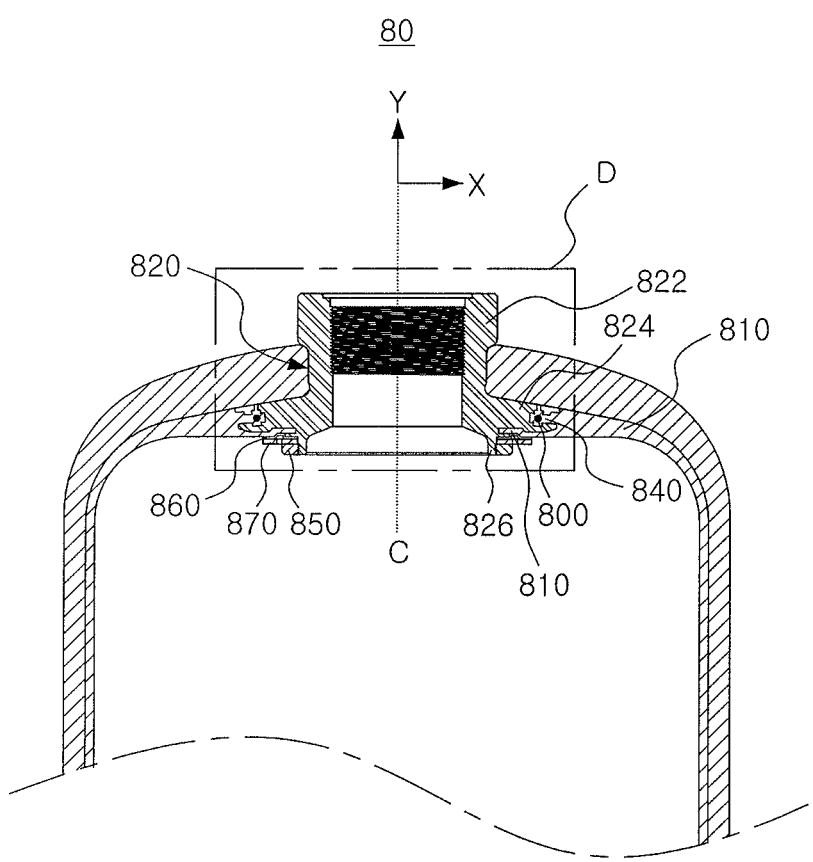
FIG. 13 is a partial cross-sectional view illustrating the pressure vessel of FIG. 12.

FIG. 12 is a partial exploded perspective view illustrating a pressure vessel 80 according to another embodiment of the present invention, and FIG. 13 is a partial cross-sectional view illustrating the pressure vessel 80.

Figure 14:
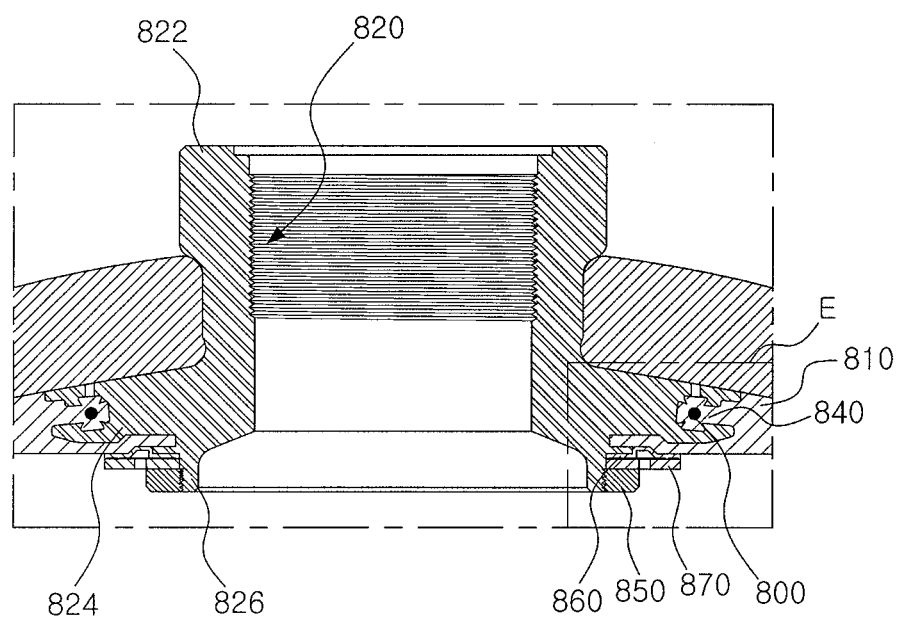
FIG. 14 is a schematic enlarged view illustrating D of FIG. 13.
Figure 15:
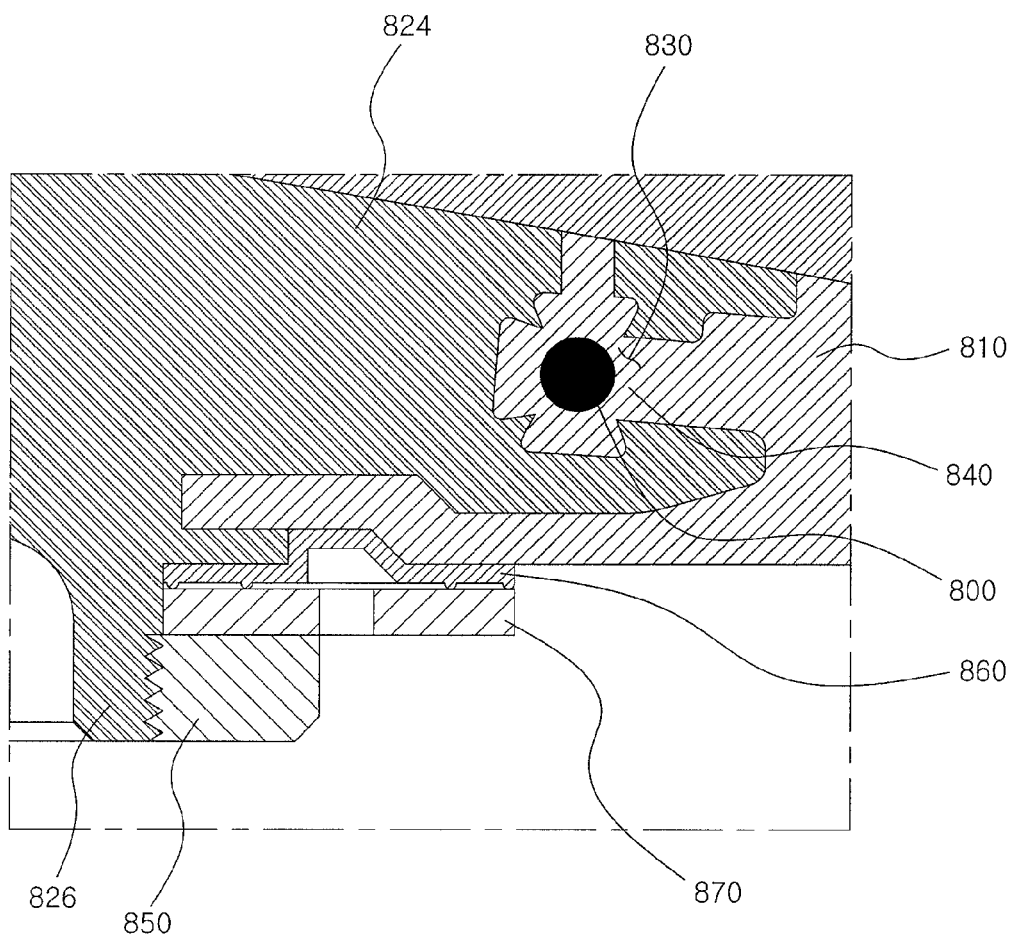
FIG. 15 is a schematic enlarged view illustrating E of FIG. 14.

Also, FIG. 14 is a schematic enlarged view illustrating D of FIG. 13, and FIG. 15 is a schematic enlarged view illustrating E of FIG. 14.

Referring to FIGS. 12 to 15, since the pressure vessel 80 has the same configuration and effects as the pressure vessel 10 described with reference to FIGS. 1 to 11 except a separation preventing part 800, a description except the separation preventing part 800 will be omitted.

The separation preventing part 800 is an element surrounded by a liner 810 and preventing a separation between a nozzle-boss 820 and the liner 810 and may be disposed in a space provided by a boundary between the nozzle-boss 820 and the liner 810.

Figure 17:
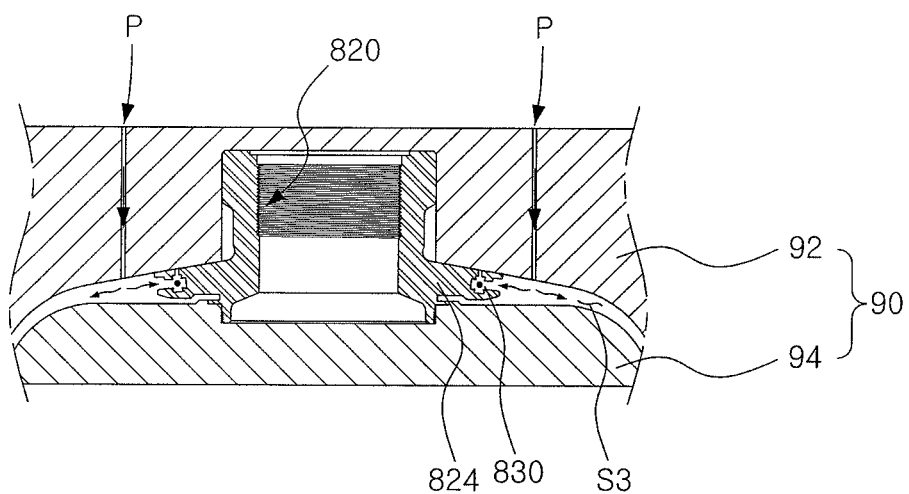

In other words, the separation preventing part 800 may be disposed inside a fastening part 830 and then may be surrounded by the liner 810 by insert-injection molding using synthetic resin P (refer to FIG. 17).

In this case, in the case of the pressure vessel 80, due to the separation preventing part 800 disposed inside the fastening part 830, the separation between the nozzle-boss 820 and the liner 810 caused by a difference between thermal expansion coefficients thereof may be more reduced.

In other words, the separation preventing part 800 is formed of a material having greater hardness or solidity than the liner 810 and is formed sequentially along a circumferential direction, thereby more increasing a binding force between the nozzle-boss 820 and the liner 810.

That is, when repetitively inserting and discharging, expansion and contraction of the liner 810 are greater than the nozzle-boss 820, in which a fastening-corresponding part 840 of the liner 810 is pushed outward from the fastening part 830. However, the separation preventing part 800 having the hardness or solidity greater than the liner 810 pulls the fastening-corresponding part 840 inward, thereby preventing the separation between the liner 810 and the nozzle-boss 820 in advance.

Figure 16:
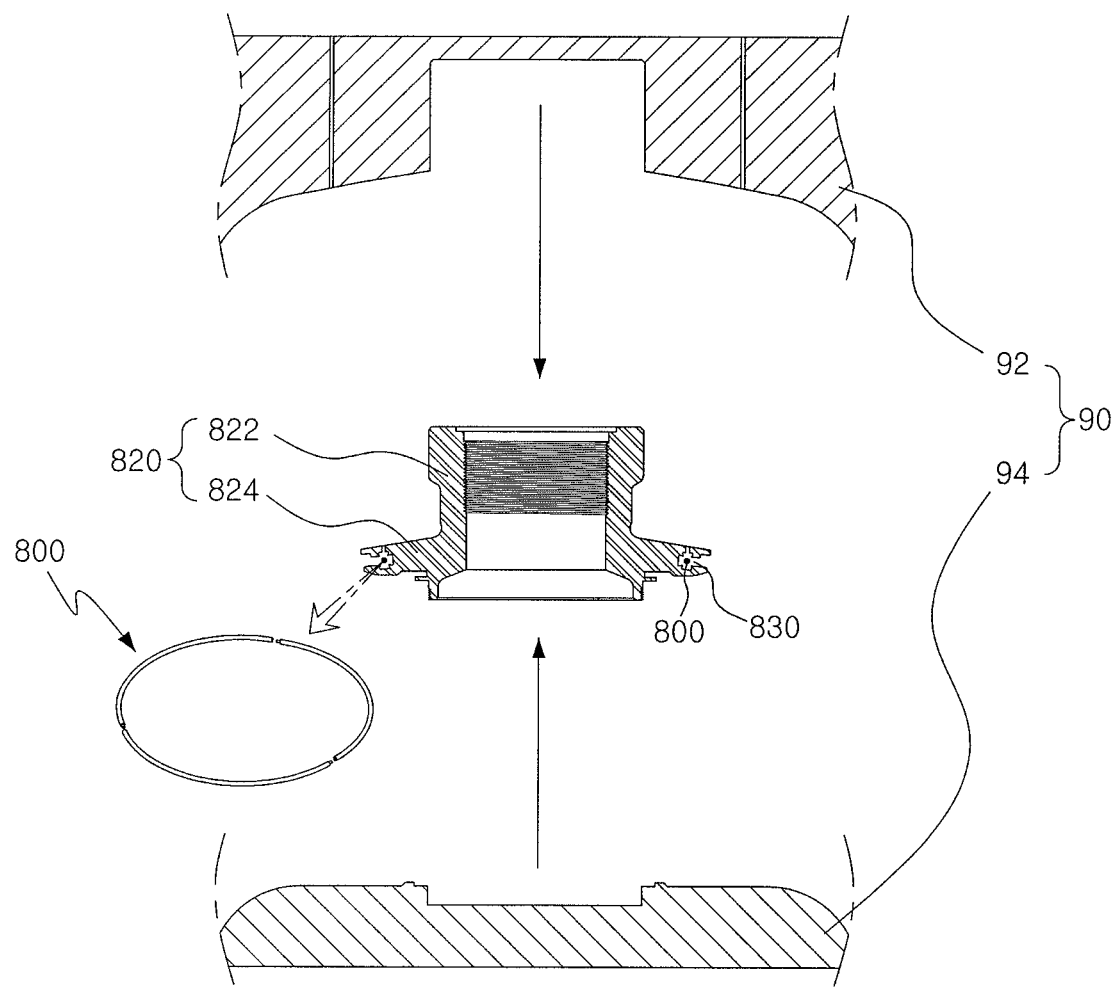
FIGS. 16 to 18 are schematic cross-sectional views illustrating a process of coupling a nozzle-boss with a liner included in the pressure vessel of FIG. 12.

Merely, the separation preventing part 800 is not limited to being sequentially formed along the circumferential direction but may be separated into two parts or more to be stably inserted into a flange part 824 into the fastening part 830 and then the respective parts may be coupled with one another to be formed as a single body (refer to FIG. 16).

On the other hand, a neck part 822 of the nozzle-boss 820 may include a projection 826 projected downwardly in an axial direction and a screw thread may be formed on a lower-outer circumferential surface of the projection 826 to screw-couple with a pressure improving part 850.

In detail, a sealing part 860, a pressure part 870, and the pressure improving part 850 may be sequentially inserted into and fastened to the projection 826 downwardly in the axial direction, and accordingly, the sealing part 860, the pressure part 870, and the pressure improving part 850 may be stably inserted-fastened to the projection 826 by screw-coupling the pressure improving part 850 with the projection 826.

Figure 18:
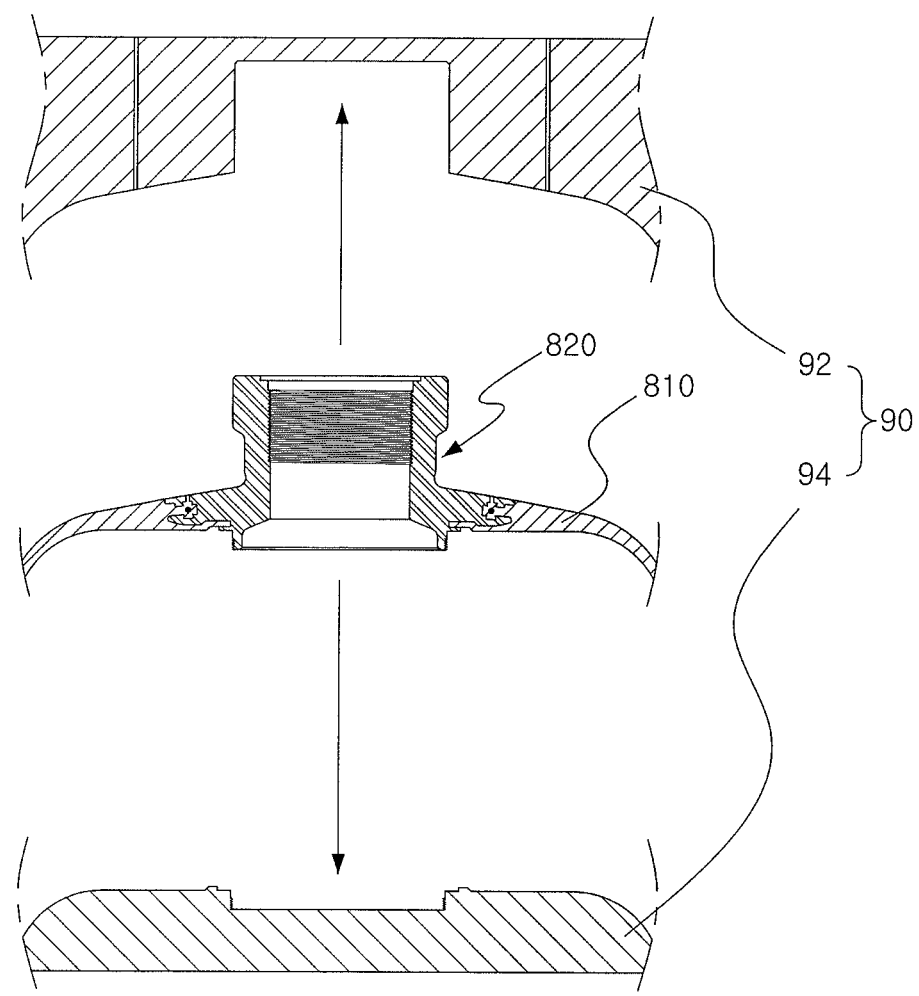

FIGS. 16 to 18 are schematic cross-sectional views illustrating a process of coupling the nozzle-boss 820 with the liner 810 included in the pressure vessel 80.

Referring to FIG. 16, the nozzle-boss 820 including the neck part 822 and the flange part 824 are manufactured by processing steel that is metallic or aluminum or plastic that is nonmetallic.

The nozzle-boss 820 previously manufactured may include the fastening part 830 depressed inward in a radial direction and sequentially formed in a circumferential direction, and the separation preventing part 800 having greater hardness or solidity than the liner 810 is inserted into the fastening part 830.

On the other hand, the separation preventing part 800 may be formed to be separated into two parts or more to be smoothly inserted into the fastening part 830 and respective parts are inserted into the fastening part 830 and both ends thereof are coupled with one another, thereby providing the separation preventing part 800 formed in a ring shape as a single body.

Referring to FIG. 17, the nozzle-boss 820 including the fastening part 800 inserted into the fastening part 830 is inserted into the inner space S3 of the injection mold 90 including the upper mold 92 and the lower mold 94 for insert-injection molding and then synthetic resin P is inserted into the injection mold 90, thereby forming the liner 810 coupled with the nozzle-boss 820.

Referring to FIG. 18, when the insertion of the synthetic resin P into the injection mold 90 is finished, the upper mold 92 and the lower mold 94 are separated from each other, thereby completing a process of forming the nozzle-boss 820 and the liner 810 as a single body.

Merely, the pressure vessel 80 that is the end result is manufactured by thermally welding two hemisphere-shaped single bodies formed of the nozzle boss 820 and the liner 810 and a liner formed in a pipe shape to one another and then surrounding a surface of the liner 810 with the composite material 400 or deposited the composite material 400 thereon (refer to FIG. 1).

Figure 19:
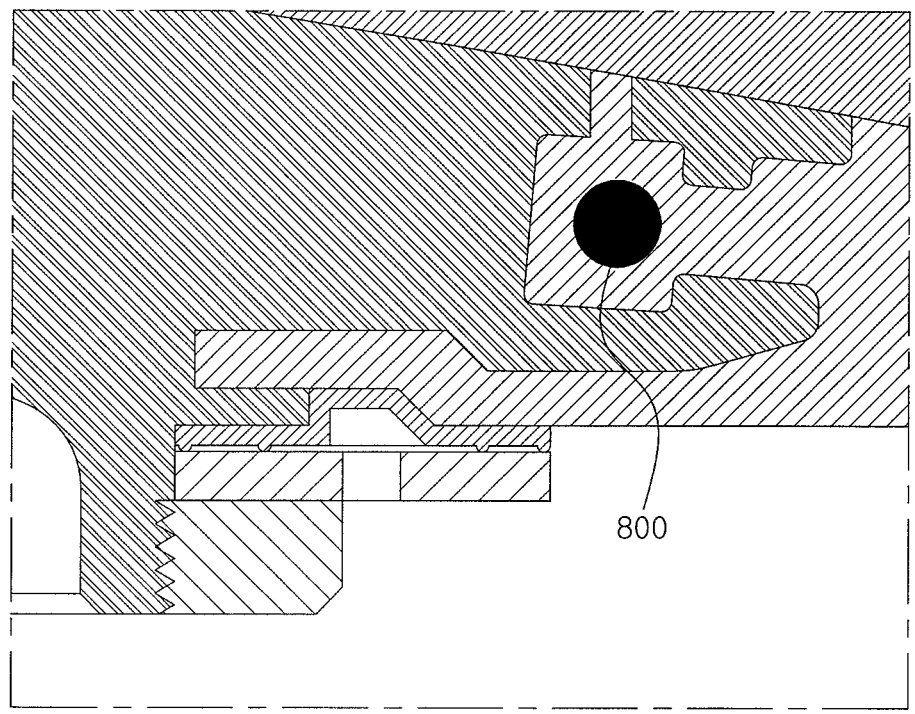
FIG. 19 is a schematic enlarged view illustrating a modified example of E of FIG. 14

FIG. 19 is a schematic enlarged view illustrating a modified example of D of FIG. 14.

Referring to FIG. 19, the separation preventing part 800 may be applied to the pressure vessel described with reference to FIG. 11 as the same.

According to the pressure vessel, it is possible to prevent an abnormal leakage of a fluid by preventing a separation between a nozzle-boss and a liner occurring due to a difference between thermal-expansion coefficients thereof while repetitively filling and discharging the fluid.

Also, it is possible to prevent a contact between a boundary between a nozzle-boss and a liner and a fluid simultaneously with previously cutting off a path of an abnormal leakage of a fluid.

Also, when inner pressure is low, it is possible to strengthen a binding force between a nozzle-boss and a liner.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:
1. A pressure vessel comprising:
   a nozzle-boss comprising a neck part including a hollow portion and a flange part extended outward from the neck part;
   a liner coupled with the nozzle-boss to provide a space filled with a fluid therein;
   a sealing part inserted into a lower end of the neck part to prevent a spillage of the fluid via a boundary between the nozzle-boss and the liner by preventing a direct contact between the fluid and the boundary; and
   a pressure part inserted into the lower end of the neck part to press the sealing part upwardly in an axial direction,
   wherein the sealing part includes a contact-providing part in contact with the liner and the flange part, and the contact-providing part is projected to fit into an insertion space concavely formed by the flange part and the liner to form a pressure space communicated with the space of the liner, and
   wherein a bottom surface of the sealing part comprises a projection projected toward the pressure part to increase an adhesive force between the sealing part and the pressure part.

2. The pressure vessel of claim 1, wherein an upper outer surface of the contact-providing part is formed to be inclined downwardly toward an outside in a radial direction.

3. The pressure vessel of claim 1, wherein the liner comprises a cover part covering a certain area of a bottom of the flange part and the flange part comprises an insertion space forming part covering an inner end of the cover part to form a certain insertion space inside the cover part, and
wherein the contact-providing part is closely attached to the insertion space.

4. The pressure vessel of claim 1, wherein the projection is formed sequentially in at least one row along a circumferential direction.

5. The pressure vessel of claim 1, wherein the pressure part comprises at least one pressure hole to transfer pressure of the fluid to the sealing part.

6. The pressure vessel of claim 1, further comprising a pressure improving part improving a fastening force of the sealing part by pressing the sealing part.

7. The pressure vessel of claim 1, further comprising a separation preventing part surrounded by the liner and preventing a separation between the nozzle-boss and the liner.

8. The pressure vessel of claim 7, wherein the separation preventing part is disposed inside a space provided by the boundary between the nozzle-boss and the liner.

9. The pressure vessel of claim 7, wherein the separation preventing part is formed of a material having greater hardness or solidity than the liner.

10. The pressure vessel of claim 1, wherein the flange part comprises a fastening part formed to be depressed inward in a radial direction in such a way that the liner is disposed and fastened to the flange part, and
wherein a separation preventing part is disposed inside the fastening part.

11. The pressure vessel of claim 10, wherein the liner is coupled with the nozzle-boss by insert-injection molding, and
wherein the flange part comprises at least one insertion hole connected to the fastening part to discharge air existing inside the fastening part when synthetic resin for manufacturing the liner is inserted into the fastening part.

12. The pressure vessel of claim 10, wherein the liner comprises a fastening-corresponding part formed to be corresponding to the fastening part.

13. The pressure vessel of claim 10, wherein the fastening part allows a coupling space with which the liner is coupled to be increased toward the inside in the radial direction.

14. The pressure vessel of claim 10, wherein the fastening part comprises a first fastening part and a second fastening part formed to be greater than the first fastening part, which are different in a width in an axial direction or a size relative to the coupling space with which the liner is coupled, and
wherein the second fastening part is formed inside the first fastening part in the radial direction and the separation preventing part is disposed inside the second fastening part.

15. The pressure vessel of claim 10, wherein a cross-section of the fastening part in the axial direction has a cross shape to increase a coupling force between the liner and the flange part.

16. A pressure vessel comprising:
a nozzle-boss comprising a neck part including a hollow portion and a flange part extended outward from the neck part;
a liner coupled with the nozzle-boss to provide a space filled with a fluid therein;
a sealing part inserted into a lower end of the neck part to prevent a spillage of the fluid via a boundary between the nozzle-boss and the liner by preventing a direct contact between the fluid and the boundary; and
a pressure part inserted into the lower end of the neck part to press the sealing part upwardly in an axial direction,
wherein a bottom surface of the sealing part comprises a projection projected toward the pressure part to increase an adhesive force between the sealing part and the pressure part.

17. The pressure vessel of claim 16, wherein the projection is formed sequentially in at least one row along a circumferential direction.

* * * * *